United States Patent [19]

Carobolante

[11] Patent Number: 5,297,024

[45] Date of Patent: Mar. 22, 1994

[54] VOICE COIL DRIVER WITH VARIABLE GAIN IN SEEK AND TRACK-FOLLOW MODES

[75] Inventor: Francesco Carobolante, San Jose, Calif.

[73] Assignee: SGS-Thomson Microelectronics, Inc., Carrollton, Tex.

[21] Appl. No.: 983,690

[22] Filed: Dec. 1, 1992

[51] Int. Cl.[5] .................. G11B 5/02; G11B 5/596
[52] U.S. Cl. .................. 360/67; 360/78.04
[58] Field of Search ............... 360/46, 61, 67, 68, 360/65, 77.02, 78.04; 369/32, 44.25, 44.28, 44.27, 44.29, 44.35, 44.36, 43; 363/98, 132, 17; 307/491, 571

[56] References Cited

U.S. PATENT DOCUMENTS

| | | | |
|---|---|---|---|
| 4,551,772 | 11/1985 | Sliger | 360/46 |
| 4,920,461 | 4/1990 | Eiberger | 360/68 |
| 4,980,784 | 12/1990 | Ogura | 360/77.03 X |
| 5,041,773 | 8/1991 | Takahashi | 360/77.08 X |
| 5,111,381 | 5/1992 | Pigott et al. | 363/132 |
| 5,117,408 | 5/1992 | Weispfeming et al. | 360/78.14 X |
| 5,126,603 | 6/1992 | Hattori | 307/571 |
| 5,128,564 | 7/1992 | Harsey et al. | 307/491 X |
| 5,191,297 | 3/1993 | Penman et al. | 360/67 X |
| 5,210,662 | 5/1993 | Nishijima | 360/77.08 X |

FOREIGN PATENT DOCUMENTS 4295603 10/1992 Japan ............... 360/67

Primary Examiner—John Shepperd
Assistant Examiner—Le Thien Minh
Attorney, Agent, or Firm—Richard A. Bachand; Lisa K. Jorgenson; Richard K. Robinson

[57] ABSTRACT

A driver circuit for providing drive current to a coil for positioning a read/write head of a memory disk system and method are presented. The driver circuit includes a pair of high side driver transistors having current paths connected between respective terminals of the coil and a voltage source, a first pair of low side driver transistors having current paths connected between respective terminals of the coil and a first voltage sense node, and a second pair of low side driver transistors having current paths connected between respective terminals of the coil and a second voltage sense node. A first sense resistor is connected between the first and second voltage sense nodes, and a second sense resistor is connected between the second sense node and a reference potential. A first set of selection switches operates to select one of the pair of high side driver transistors and one transistor of each of the first and second pairs of the low side driver transistors to establish a current path through the selected transistors and the coil in response to a direction signal. A second set of selection switches operates to select one or the other of the selected low side driver transistors in response to a seek and track-follow mode selection signal. A circuit is also provided for applying a coil current signal to a low side driver transistor selected by the first and second sets of selection switches.

20 Claims, 2 Drawing Sheets

VOICE COIL DRIVER WITH VARIABLE GAIN IN SEEK AND TRACK-FOLLOW MODES

BACKGROUND OF THE INVENTION

1. Field of the Invention

This invention pertains to improvements in electronic circuitry used in moving read/write heads in a memory disk system of the type used in computer systems or the like, and, more particularly, to improvements in such circuitry for providing linear drive signals to a "voice coil" of such system.

2. Relevant Background

A coil that serves as an actuator to move and position the read/write heads of a memory disk drive of the type used in a computer system is widely referred to as a "voice coil". Such memory disk drives are typically found in so-called "hard-disk" drives, CD ROM drives, and so on. The actuator coils are known in the art as "voice coils" due to their similarity to coils commonly used in audio loud speaker systems or the like. Such voice coils are operated in a manner similar to acoustic voice coils since a positive current applied to the coil produces a corresponding positive direction of motion of the read/write head. A negative current applied to the voice coil produces a corresponding negative displacement of the read/write head.

Ideally, the system is linear, so that the acceleration of the read/write head is directly proportional to the magnitude of the current applied to the voice coil. However, in distinction to acoustic voice coils, the voice coils used in disk drive systems typically drive a read/write head mechanism that has virtually no suspension or spring mechanism. Thus, a dc current must be capable of being continuously provided to the voice coil to establish and maintain the desired position of the read/write head mechanism.

In operation of voice coil systems used in memory disk drives, two modes are generally provided. The first mode is referred to as a "seek" mode in which large currents are applied to the voice coil to rapidly bring the head mechanism and the read/write head to the point or track on the disk media at which the information desired to be read or written is located. Then, a "track-follow" (TF) mode is entered in which smaller currents are applied to the voice coil to maintain the position of the read/write head on the desired track of the disk media.

In the track-follow mode, tracking information commonly emplaced on the disk memory media is used in maintaining the head position with respect to the track through various known servomechanism techniques. It will therefore be appreciated that in the track-follow mode, a high degree of precision in the head placement is required to accurately read or write the data.

Because of the high degree of linearity that is required in moving and positioning the read/write head mechanism, and because of the relatively large currents which are required in the "seek" mode, typically the amplifiers employed in a voice coil driver system are operated as "Class AB" amplifiers.

One of the advantages of a Class AB amplifier stage is that at the crossover point, or change of direction of the drive current supplied to the voice coil, discontinuities are relatively small. This is due, in part, to the fact that there is always biasing current flowing through the output stages. Accordingly, generally one amplifier stage does not completely turn off before the other turns on in a current reversing event. As a result, the transfer function of the currents through the load is relatively linear through the origin as the current changes sign. The disadvantage, of course, is that the circuit has power dissipation, even when the load current is at a minimum or zero. This is not insignificant, especially in low power devices such as portable computers or the like.

An electrical schematic diagram of a typical voice coil driver system 10 of the prior art is shown in FIG. 1. The voice coil 11 shown may be a part of the read/write head mechanism of a disk drive of the type used in personal, portable, or other computers. Two amplifiers 13 and 14 are provided for delivering drive current to a voice coil 11.

An input voltage, "$V_{IN}$", is applied to the circuit 10 from a servocontroller with which the voice coil system 10 is associated. Ideally, the relationship between $V_{IN}$ and the current applied to the voice coil is directly proportional.

The amplifiers 13 and 14 are generally connected to serve as a bridge driver for the voice coil 11. It will be appreciated that the driver circuit 10 is a high performance device, and, therefore, requires precise components for implementation. Moreover, in order to achieve the precision needed, typically, a large number of operational amplifiers are employed, again, each with precision components. Additionally the amplifiers 13 and 14 of the system 10 operate in Class AB mode. Therefore, as mentioned, the biasing currents used within the Class AB amplifiers is always flowing.

In the past, efforts have been advanced to provide amplifiers in voice coil driver circuits that are not Class AB amplifiers, in order to enable drive currents of increased magnitude to be readily accomplished. However, such driver circuits typically have either "deadbands" or "jumps" in their transfer functions that are undesirably large. A "jump" in the transfer function results in a discontinuity as the input voltage changes sign, and results in the output current jumping from a negative value to a positive value discontinuously at zero volts input. A "deadband", on the other hand, is a discontinuity in which the output current remains at zero as the input voltage changes sign. Thus, in order to be enabled to use amplifiers other than those of Class AB type, the jump and/or deadband discontinuities must be minimized to enable the heads to be accurately positioned and maintained at the desired position.

The main advantage, of course, in enabling a non-Class AB type operation is the reduction or elimination of the biasing currents that are required in Class A or AB type operation.

SUMMARY OF THE INVENTION

In light of the above, it is, therefore, an object of the invention to provide an improved voice coil driver.

It is another object of the invention to provide an improved voice coil driver that reduces circuit complexity and can be realized with less circuitry hardware than heretofore.

It is another object of the invention to provide an improved voice coil driver of the type described that enables increased precision in positioning the read/write heads of a memory disk drive of the type used in computer systems or the like.

It is another object of the invention to provide an improved voice coil system that has reduced requirements for the number and precision of the components of which it is constructed.

It is still another object of the invention to provide a voice coil system that has reduced power dissipation and biasing requirements.

It is yet another object of the invention to provide an improved voice coil driver that has a higher efficiency than voice coil drivers heretofore, and yet has relatively small discontinuities when the load current changes direction or sign.

It is still another object of the invention to provide a voice coil driver system in which drive currents do not co-exist in the respective high side drivers as the load current changes direction.

These and other objects, features and advantages of the invention will be apparent to those skilled in the art from the following detailed description of the invention, when read in conjunction with the accompanying drawings and appended claims.

In accordance with a broad aspect of the invention, a driver circuit is presented that provides drive current to a coil for positioning a read/write head of a memory disk system in which a coil current signal that includes a direction signal is provided and a seek and track-follow mode selection signal is also provided. The driver circuit includes a pair of high side driver transistors having current paths connected between respective terminals of the coil and a voltage source, a first pair of low side driver transistors having current paths connected between respective terminals of the coil and a first voltage sense node, and a second pair of low side driver transistors having current paths connected between respective terminals of the coil and a second voltage sense node. A first sense resistor is connected between the first and second voltage sense nodes, and a second sense resistor is connected between the second sense node and a reference potential. A first set of selection switches operates to select one of the pair of high side driver transistors and one transistor of each of the first and second pairs of the low side driver transistors to establish a current path through the selected transistors and the coil in response to the direction signal. A second set of selection switches operates to select one or the other of the selected low side driver transistors in response to the seek and track-follow mode selection signal. A circuit is also provided for applying the coil current signal to a low side driver transistor selected by the first and second sets of selection switches.

In accordance with another broad aspect of the invention, a circuit is presented for driving a coil for positioning a read/write head of a memory disk system in which a first signal providing coil current and direction information and a second signal providing seek and track-follow mode selection information are provided. A pair of high side driver transistors has current paths connected between respective terminals of the coil and a voltage source, one or the other of which being selected by the direction information of the first signal, and a low side driver circuit is connected to the terminals of the coil to provide current flow paths selectively in either direction through the coil and a selected one of the pair of high side driver transistors, in response to the direction information of the first signal, the low side driver circuit also being connected to receive the coil current information of the first signal for controlling the position of the read/write head. A gain selection circuit changes the gain of the coil driving circuit in response to the seek and track-follow mode selection information of the second signal.

In yet another broad aspect of the invention, a method is presented for driving a coil for positioning a read/write head of a memory disk system in which a first signal providing coil current and direction information and a second signal providing seek and track-follow mode selection information are provided. According to the method, a pair of high side driver transistors are arranged with current paths connected between respective terminals of the coil and a voltage source. One or the other of the high side driver transistors is selected by the direction information of the first signal. A low side driver circuit is arranged to provide current flow paths selectively in either direction through the coil and a selected one of the pair of high side driver transistors, in response to the direction information of the first signal, the low side driver circuit also being connected to receive the coil current and direction information of the first signal for controlling the position the read/write head. Finally, a gain of the coil driving circuit is changed in response to the seek and track-follow mode selection information of the second signal.

BRIEF DESCRIPTION OF THE DRAWING

The invention is illustrated in the accompanying drawing in which.

DETAILED DESCRIPTION OF THE PREFERRED EMBODIMENTS

Figure 2:
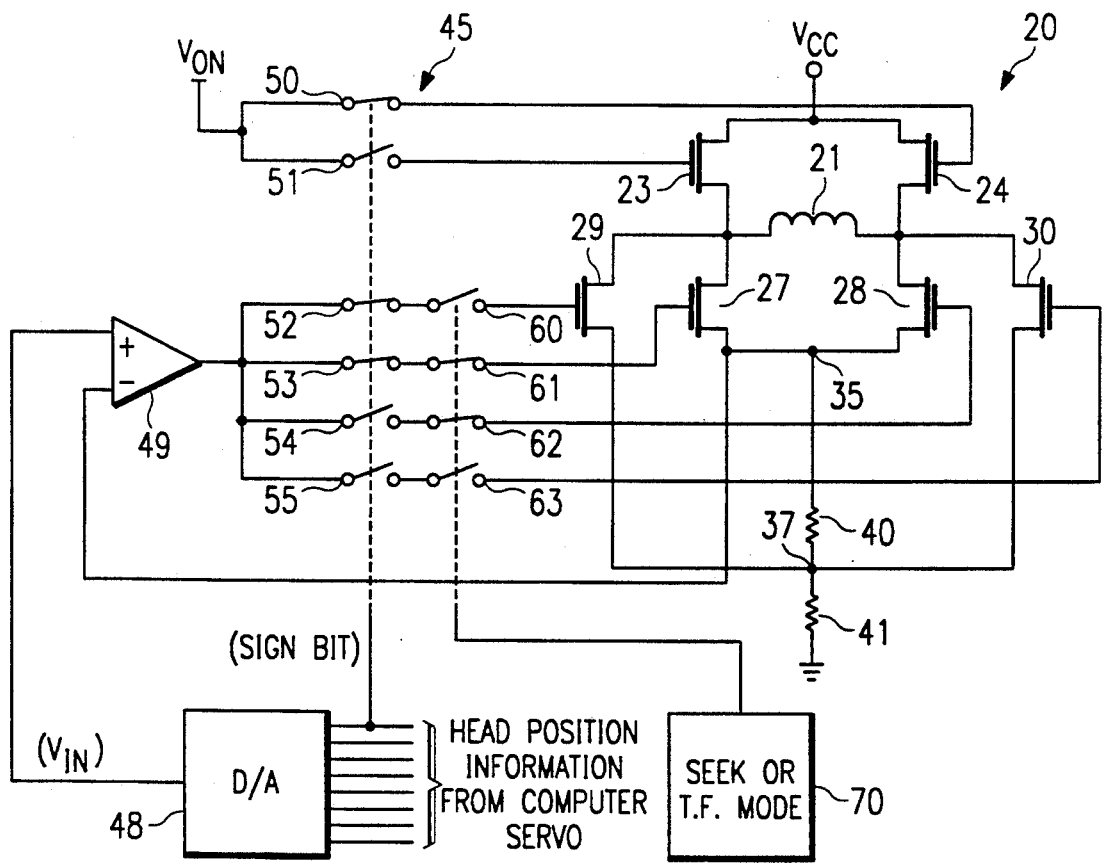
FIG. 2 is an electrical schematic diagram of a voice coil system, in accordance with a preferred embodiment of the invention.

With reference now to FIG. 2, an electrical schematic diagram of a voice coil driver system 20 is shown. The voice coil system 20 includes a voice coil 21 which may be similar to or the same as voice coils previously used in the art. A transconductance loop is provided having high side driver transistors 23 and 24 and low side transistors 27-30.

The drain-to-source current paths of the high side transistors 23 and 24 are connected from a voltage source to the respective sides of the voice coil 21. Similarly, the drain-to-source paths of the low side driver transistors 27 and 28 are connected to the respective terminals of the voice coil 21 and a first voltage sense node 35. The drain-to-source current paths of the low side driver transistors 29 and 30 also are connected between the respective terminals of the voice coil 21 and a second current sensing node 37. A first sense resistor 40 is connected between the first current sense node 35 and second current sense node 37. Additionally, a second sense resistor 41 is connected between the second sense node 37 and a reference potential, or ground.

The input to the circuit 20 for the positioning of the heads by the voice coil 21 is achieved by receiving digital (for example) coil current information from the servocontroller with which the system is associated. The digital head position information is converted to an analog signal by a digital-to-analog converter 48. The analog output from the digital-to-analog converter 48, denoted "$V_{IN}$", is applied to an amplifier 49 for application to the transconductance loop through switching network 45. The amplifier 49 can be, for example, an operational transconductance amplifier (OTA), such amplifiers being well known in the art.

The selection of the individual transistors 23-24 and 27-30 is done through the switch network 45 that includes a first and a second set of switches. The first set of selection switches includes switches 50-55 that operate to select one of the pair of high side driver transistors 23 or 24 and one transistor of each of the first and second pairs of the low side driver transistors 27-30 to establish a current path through the selected transistors and the coil 21 in response to a direction signal, or sign bit in the head position information. The switching network 45 also includes a second set of selection switches 60-63 that operate to select one or the other of the selected low side driver transistors in response to the seek and track-follow mode selection signal. The switches 50-55 and 60-63 can be transistor switches, such transistor switches being well known in the art.

More particularly, the first set of switches 50-55 are responsive to the sign bit of the coil current information from the servocontroller with which the system is associated. The sign bit indicates the required direction of current that needs to be established in the voice coil 21. The second set of switches 60-63 are also responsive to a signal from the servocontroller with which the system is associated, indicated generally by the box 70, that indicates whether the operating mode is "seek" or "track-follow" mode, such circuitry being known presently in the art.

Thus, the switches 50 and 51 serve to connect the bases of respective high side driver transistors 24 and 23 selectively to an ON voltage, "$V_{ON}$". The $V_{ON}$ is applied, if desired, via a high side pre-drive circuit (not shown), if desired, when the respective high side driver transistors 23 and 24 are desired to be actuated.

The voltage input representing the coil current information delivered through the operational amplifier 49 is applied to the gate of a selected one of the low side driver transistors 27-30, depending upon whether the circuit is in seek or track-follow mode and depending upon the direction of current to be supplied to the voice coil 21. Thus, switches 52 and 60 connect the gate of the low side driver transistor 29 to the output of the amplifier 49. Transistors 53 and 61 connect the gate of the low side driver transistor 27 to the output of the amplifier 49. Switches 54 and 62 connect the gate of the low side driver transistor 28 to the output of the amplifier 49. Finally, switches 55 and 63 connect the gate of the low side driver transistor 30 to the output of the amplifier 49.

In operation, in response to the sign bit of the head position information, a current path is established through one of the high side driver transistors 23 or 24 through the voice coil 21 and through a selected one of the low side driver transistors on the opposite side of the voice coil. Thus, in the configuration shown, the high side driver 24 is shown with its gate connected to $V_{ON}$. Current, therefore, flows from the voltage source, $V_{cc}$, through the source to drain current path of the transistor 24 through the voice coil 21 to one or the other of the low side driver transistors 27 or 29.

Thus, consistent with the actuation of the switch 50 to a closed position by the sign bit of the head position information, the switches 52 and 53 that select either of the low side driver transistors 27 or 29 are also closed.

Alternatively, if the sign bit of the head position information had been of opposite sign, switches 50, 52, and 53 would have been opened, and switches 51, 54, and 55 would have been closed, thereby selecting the high side driver transistor 23 and the low side driver transistors 28 and 30.

In addition, depending upon whether the voice coil driver circuitry is in seek or track-follow mode, switches 61 and 62 or switches 60 and 63 are closed. In the diagram of FIG. 2, switches 61 and 62 are shown closed to select either low side driver transistor 27 or low side driver transistor 28, whereas, switches 60 and 63 are open to de-select low side driver transistor 29 or low side driver transistor 30.

Depending upon which low side driver transistor is selected dictates which sense resistor is effectively in the circuit. Thus, if either low side driver transistor 27 or 28 is selected, the sum of the resistances of resistors 40 and 41 is included in the circuit. On the other hand, if either low side transistor 29 or 30 is selected, the current through the voice coil flows only through the resistor 41. Therefore, in the track-follow mode in which increased sensitivity and precision are required, both resistors 40 and 41 are selected to be in the circuit so that a smaller output current is produced in response to an input voltage that would produce a higher current in the seek mode in which only resistor 41 is selected.

Figure 3:
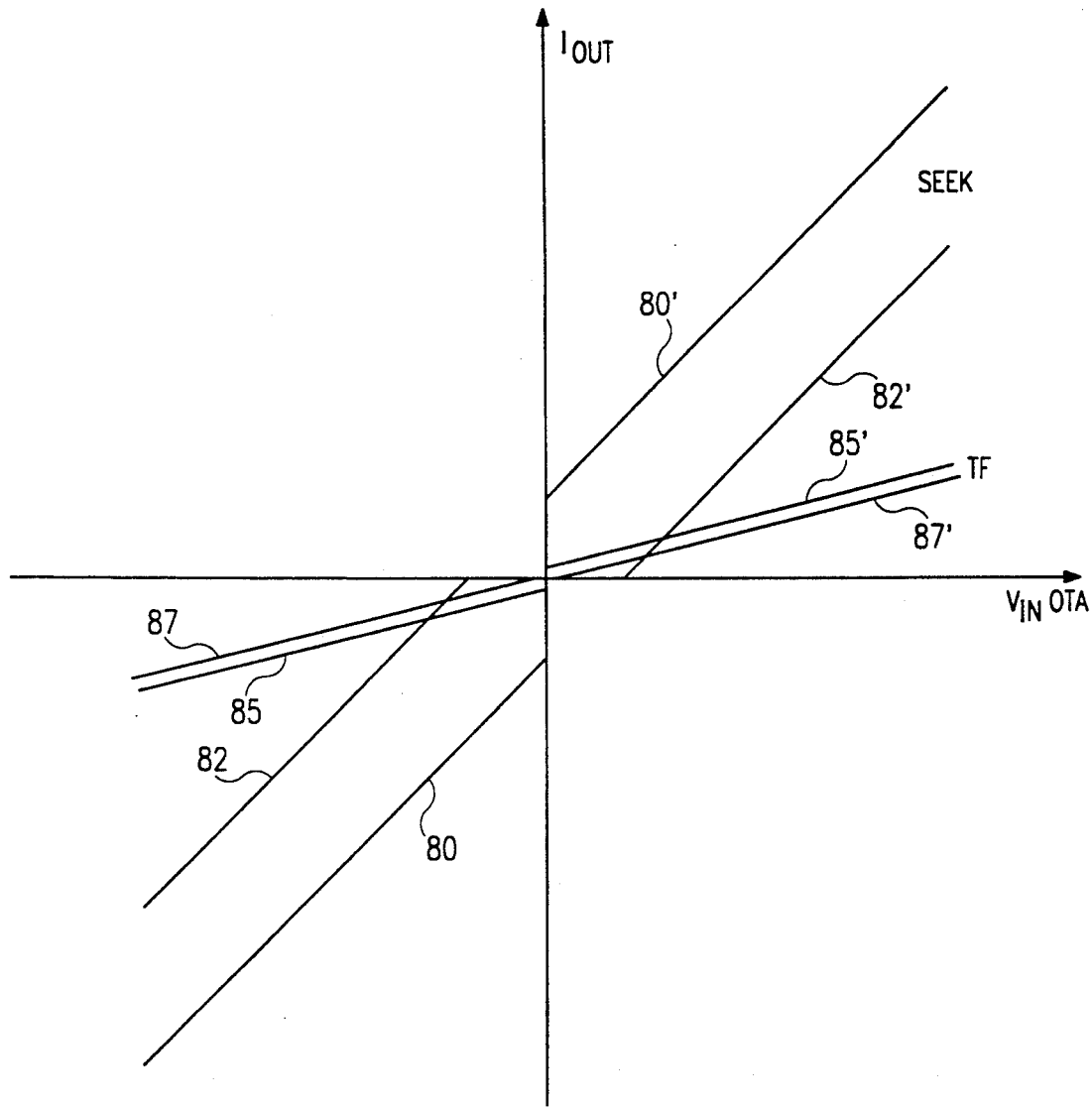
FIG. 3 is a plot of output current to a voice coil with respect to input voltage, produced by the circuit of FIG. 2.

Since the circuit 20 does not necessarily need to be operated in Class AB mode of operation, a transfer function as shown in FIG. 3 may be produced. Thus, it is noted that operation along curve 80 or 80' or along curve 82 or 82' may provide a jump or deadband near the origin, in the seek mode. Likewise, operation along curve 85 and 85' or 87 and 87' may produce a jump or deadband at the origin in the track-follow mode. It should be emphasized, however, that the response in either mode is essentially linear, and that the jump and deadbands that exist can be made relatively small.

Figure 1:
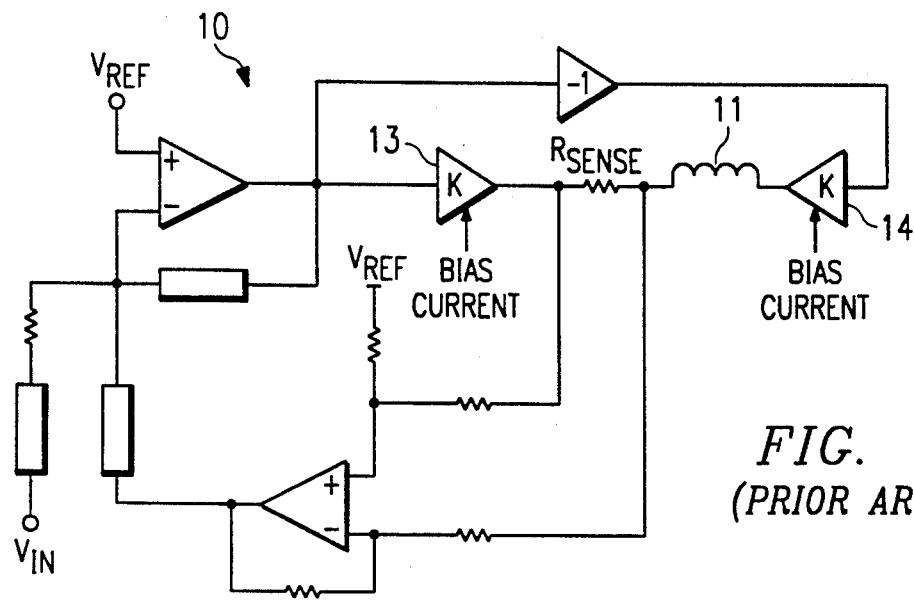
FIG. 1 is a schematic diagram of a voice coil driver system, in accordance with the prior art.

It will be appreciated that the only circuitry required to accomplish the voice coil system 20 is switches on the high side driver transistors and a single amplifier 49 and switches to drive the low side driver transistors 27-30. This is a significant reduction in the circuit complexity than required in prior art circuits, such as that illustrated in FIG. 1. Additionally, since only two transistors in the current path between $V_{cc}$ and ground are on at any one time, essentially the only quiescent bias current existing in the circuit 20 is that of the amplifier 49.

Also, in addition to the advantages described above, since the gain of the circuit 20 is effectively modified by the selection of one or both of the sense resistors 40 and 41, the resolution of the digital to analog converter 48 can be relaxed, since the track-follow mode resolution can be precisely adjusted by the appropriate sizing of the sense resistors 40 and 41.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:
1. A driver circuit for providing drive current to a coil for positioning a read/write head of a memory disk system in which a coil current signal that includes a direction signal is provided and a gain selection signal is also provided, comprising:
- a pair of high side driver transistors having current paths connected between respective terminals of the coil and a voltage source;
- a first pair of low side driver transistors having current paths connected between respective terminals of the coil and a first voltage sense node;
- a second pair of low side driver transistors having current paths connected between respective terminals of the coil and a second voltage sense node;
- a first sense resistor connected between the first and second voltage sense nodes;
- a second sense resistor connected between the second sense node and a reference potential;
- a first set of selection switches operative to select one of said pair of high side driver transistors and one transistor of each of said first and second pairs of said low side driver transistors to establish a current path through the selected transistors and the coil in response to the direction signal;
- a second set of selection switches operative to select one or the other of said selected low side driver transistors in response to the gain selection signal;
- a circuit for applying the coil current signal to a low side driver transistor selected by said first and second sets of selection switches.

2. The driver circuit of claim 1 wherein said circuit for applying the coil current signal comprises a digital to analog converter and an operational amplifier connected to receive an output of the digital to analog converter.

3. The driver circuit of claim 2 wherein said operational amplifier is an operational transconductance amplifier.

4. The driver circuit of claim 3 wherein said operational transconductance amplifier has an inverting input connected to the first voltage sense node and a non-inverting input connected to receive an output of the digital to analog converter.

5. The driver circuit of claim 1 wherein said selected transistors and sense resistors are configured to provide non-Class AB operation.

6. The driver circuit of claim 5 wherein said selected transistors and sense resistors are configured to provide Class B operation.

7. The driver circuit of claim 1 wherein said second set of selection switches operates to select one of said second pair of low side driver transistors or and one of said first pair of low side driver transistors depending on the value of said gain selection signal.

8. The driver circuit of claim 1 wherein said high and low side transistors are MOS transistors.

9. A circuit for driving a coil for positioning a read/write head of a memory disk system in which a first signal providing coil current and direction information and a second signal providing seek and track-follow mode selection information are provided, comprising:
- a pair of high side driver transistors having current paths connected between respective terminals of the coil and a voltage source, one or the other of which being selected by said direction information of said first signal;
- a low side driver circuit connected to the terminals of said coil to provide current flow paths selectively in either direction through said coil and a selected one of said pair of high side driver transistors, in response to said direction information of said first signal, said low side driver circuit also being connected to receive the coil current information of said first signal for controlling the current through said coil to position the read/write head;
- and a gain selection circuit for changing a gain of the coil driving circuit in response to the seek and track follow mode selection information of said second signal.

10. The circuit of claim 9 wherein said low side driver circuit comprises:
- a first pair of low side driver transistors having current paths connected between respective terminals of the coil and a first voltage sense node;
- a second pair of low side driver transistors having current paths connected between respective terminals of the coil and a second voltage sense node.

11. The circuit of claim 10 wherein said gain selection circuit comprises:
- a first sense resistor connected between the first and second voltage sense nodes;
- a second sense resistor connected between the second sense node and a reference potential;
- a first set of selection switches operative to select one of said pair of high side driver transistors and one transistor of each of said first and second pairs of said low side driver transistors to establish a current path through the selected transistors and the coil in response to a direction signal;
- a second set of selection switches operative to select one or the other of said selected low side driver transistors in response to the seek and track-follow mode selection signal.

12. The circuit of claim 11 further comprising a digital to analog converter connected to receive the first signal providing coil current and direction information to produce an analog voltage output and an operational amplifier connected to receive the analog voltage output to produce an output to the selected low side driver transistor.

13. The circuit of claim 12 wherein said operational amplifier is an operational transconductance amplifier.

14. The circuit of claim 13 wherein said operational transconductance amplifier has an inverting input connected to the first voltage sense node and a non-inverting input connected to receive the analog voltage output of the digital to analog converter.

15. The circuit of claim 14 wherein said selected transistors and sense resistors are configured to provide non-Class AB operation.

16. The circuit of claim 15 wherein said selected transistors and sense resistors are configured to provide Class B operation.

17. The circuit of claim 11 wherein said second set of selection switches operates to select one of said second pair of low side driver transistors in the seek mode and one of said first pair of low side driver transistors in the track-follow mode.

18. The circuit of claim 11 wherein said high and low side transistors are MOS transistors.

19. A method for driving a coil for positioning a read/write head of a memory disk system in which a first signal providing coil current and direction information and a second signal providing seek and track-follow mode selection information are provided, comprising:
- arranging a pair of high side drive transistors with current paths connected between respective terminals of the coil and a voltage source;

selecting one or the other of said high side driver transistors by said direction information of said first signal;

arranging a low side driver circuit to provide current flow paths selectively in either direction through said coil and a selected one of said pair of high side driver transistors, in response to said direction information of said first signal, said low side driver circuit also being connected to receive the coil current information of said first signal for controlling the current through said coil to position the read/write head;

and changing a gain of the coil driving circuit in response to the seek and track-follow mode selection information of said second signal.

20. The method of claim 19 wherein said step of changing a gain of the coil driving circuit in response to the seek and track-follow mode selection information of said second signal comprises:

changing a resistance of a sense resistor connected to said low side driver circuit.

* * * * *